United States Patent [19]

Hestad

[11] 4,278,843
[45] Jul. 14, 1981

[54] TWO-WAY AMPLIFIER ARRANGEMENT
[75] Inventor: Alfred M. Hestad, Chicago, Ill.
[73] Assignee: Anaconda-Ericsson Inc., Denver, Colo.
[21] Appl. No.: 635,239
[22] Filed: Nov. 25, 1975

Related U.S. Application Data

[63] Continuation of Ser. No. 456,971, Apr. 1, 1974, abandoned.

[51] Int. Cl.³ .............................................. H04M 3/56
[52] U.S. Cl. ............................ 179/18 BC; 179/1 CN; 179/170 R
[58] Field of Search ................. 179/1 A, 1 CN, 16 F, 179/18 AH, 18 BC, 81 B, 170 R, 170 NC, 1 AT

[56] References Cited
U.S. PATENT DOCUMENTS

| | | | |
|---|---|---|---|
| 2,691,073 | 10/1954 | Lowman | 179/170 R |
| 3,083,265 | 3/1963 | Paulaitis et al. | 179/1 CN |
| 3,135,829 | 6/1964 | Hultberg | 179/1 CN |
| 3,511,931 | 5/1970 | Vanburen | 179/1 CN |
| 3,524,929 | 8/1970 | Burns et al. | 179/1 CN |
| 3,829,626 | 8/1974 | Irwin et al. | 179/170 R |

OTHER PUBLICATIONS

"Conference Circuit for Telephone Exchange," M. Peard, IBM Technical Disclosure Bulletin, vol. 12, No. 11, Apr. 1970, pp. 1743–1744.

*Primary Examiner*—Bernard Konick
*Assistant Examiner*—Randall P. Myers
*Attorney, Agent, or Firm*—LeBlanc, Nolan, Shur & Nies

[57] ABSTRACT

A two-way amplifier arrangement which automatically controls current flowing in the transmission circuits to maintain that current at a fixed level. The two-way amplifier arrangement finds utility as a conference amplifier and as a two-way trunk amplifier.

9 Claims, 3 Drawing Figures

TWO-WAY AMPLIFIER ARRANGEMENT

This is a continuation of application Ser. No. 456,971, filed Apr. 1, 1974, now abandoned.

This invention is related to telephone circuitry, and more particularly, to two-way amplifier arrangements used in such circuitry. Amplifiers are used in telephone circuits to compensate for power losses in the transmission circuit so that the voice level is maintained at an audible point. Thus, for example, in conference call circuits, amplifiers are used to compensate for the additional load placed on such circuits as a function of the number of telephone connections to the telephone conference circuit.

At one time each line circuit of a telephone that had the facility of being connected into conference calls was equipped to be attached to an individual amplifier. This type of arrangement, besides being expensive, since a separate amplifier is required for every line circuit, also does not provide the load matching that is necessary to maintain the audible voice level desired.

To overcome some of the cost problems in such conference call arrangements, two-way amplifiers were then used. Two-way amplifiers associated with the transmission lines rather than with the individual line circuits accomodate more than one telephone.

A preferred arrangement, of course, is to have a minimum number of amplifiers servicing an entire exchange on a two-way basis. This applies both to the conference amplifiers and to the trunk amplifiers. The trunk amplifiers are required to compensate for losses in attaching the trunk to either private branch exchanges or telephone exchanges. With a two-way trunk amplifier there has to be means provided for indicating to the amplifier that the trunk is connected and that transmission is occurring.

Accordingly, an object of this invention is to provide unique two-way amplifier arrangements for use in telephone systems.

A more particular object of the invention is to provide two-way amplifier arrangements which can be used to service exchanges providing sufficient gain to both the incoming and outgoing transmission lines.

A related object of the invention is to provide an inexpensive and effective conference call circuit utilizing the unique two way amplifier arrangement. In this connection an object of this invention is to provide conference call circuits wherein singing is eliminated, echo is minimized, loss due to attenuation is compensated for by an inexpensive amplifier arrangement wherein one two-way amplifier services the entire conference call circuit.

Another related object of this invention is to provide two-way amplifier arrangements for use in connection with trunk circuits. In this respect an amplifier is provided that is inexpensive, nonetheless eliminates singing, minimizes echo and compensates for loss due to the connection of the trunk circuits.

In accordance with a preferred embodiment of this invention a two-way amplifier arrangement comprises means for detecting the additional load caused by either the interconnection of a trunk circuit to the transmission line or the setting up of a conference call circuit.

Means are provided for disabling the basic amplifier of the amplifying arrangement and for enabling it responsive to the detection of the necessity of the amplification. The amplifying arrangement when enabled provides increased current for the transmission circuits to compensate for any losses caused by additional loading.

The above-mentioned and other objects and features of this invention together with the manner of obtaining them will become more apparent and the invention itself will be best understood by making reference to the following description of a preferred embodiment of the invention taken in conjunction with the accompanying drawings, wherein.

Figure 1:
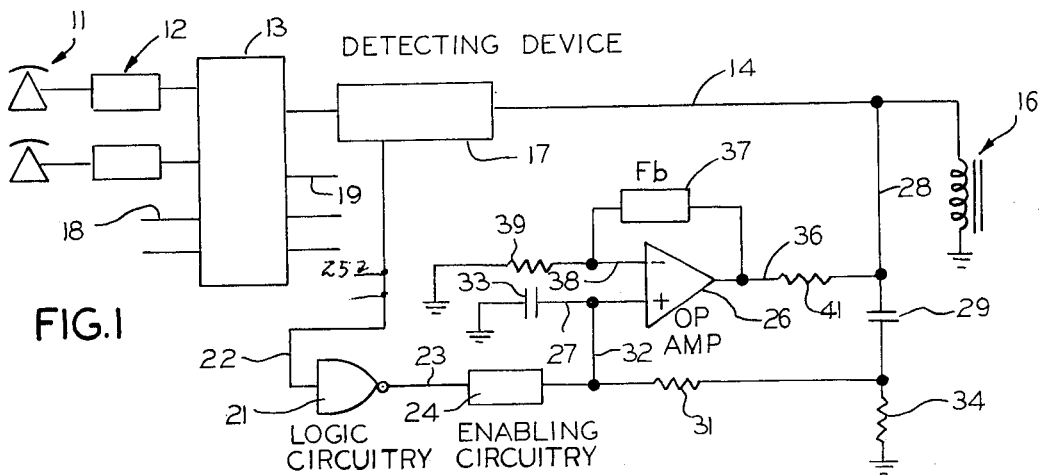
FIG. 1 is a generalized block diagram showing of the two-way amplifier arrangement for use in telephone circuits.

The generalized block diagram of FIG. 1 shows a plurality of telephone stations at 11 connected through individual line circuits, such as line circuit 12, to a switching matrix shown as block 13. The switching matrix is connected through a transmission line 14 to the well known hybrid coil schematically indicated at coil 16 for interconnection to a city trunk, for example, or to a PABX attendant cabinet.

Connected to the transmission line 14, there is shown a transmission detecting device 17. This transmission detecting device can be a link or a speech gate, for example.

As is indicated by lines, such as line 18 at the input of matrix 13, and line 19 at the output of matrix 13, there may be a plurality of telephone stations at 11 connected at the input of the matrix and a plurality of transmission lines connected at the output of the matrix. These transmission lines are each equipped with transmission detecting devices, such as shown as 17, and each are connected to the two-way amplifier arrangement.

The detecting device 17 operates to detect when the transmission path has been established; that is when the extension or the attendant is connected to the trunk. When the detecting device discerns the connected condition, it provides a signal.

Logic means are provided for transmitting a signal responsive to the detecting by circuitry 17 of an extension or an attendant connected to the trunk. More particularly, logic circuitry shown as logic block 21 is connected to the circuitry of block 17 through conductor 22. The logic circuitry 21 operates responsive to the signal provided by the detection circuitry to provide a zero output to enabling circuitry 24 over line 23.

The enabling circuitry 24 causes an operational amplifier, such as amplifier 26, to function. More particularly, the signal received on transmission line 14 is provided to the positive input 27 of the amplifier 26 through a circuit that extends from transmission line 14 over conductor 28, through a low frequency cut-off capacitor 28, coupling resistor 31 and conductor 32 to the positive input 27.

The signal to the positive input 27 of operational amplifier 26 is further filtered by a high frequency capacitor 33. The resistor 31 acts in conjunction with resistor 34 as a voltage divider to provide the required proportional signal to the positive input of the operational amplifier.

With a signal input at the positive input 27 of the operational amplifier, a signal is received at the output of the operational amplifier. The output signal is fed back through feedback circuit 37 to the negative input 38 of the operational amplifier. The negative input of the operational amplifier is also coupled to ground through resistor 39.

The feedback circuitry controls the gain of the operational amplifier. Therefore, if a positive gain is wanted, then the feedback components are adjusted to provide such a positive gain. The increased output signal is transmitted through coupling resistor 41 and conductor 28, to transmission line 14 connected to the matrix and circuit 16, for example, which can go to a city trunk or to an attendant's position. The increased current furnished by the amplifier compensates for losses resulting from the increased loads on the transmission circuits.

Figure 2:
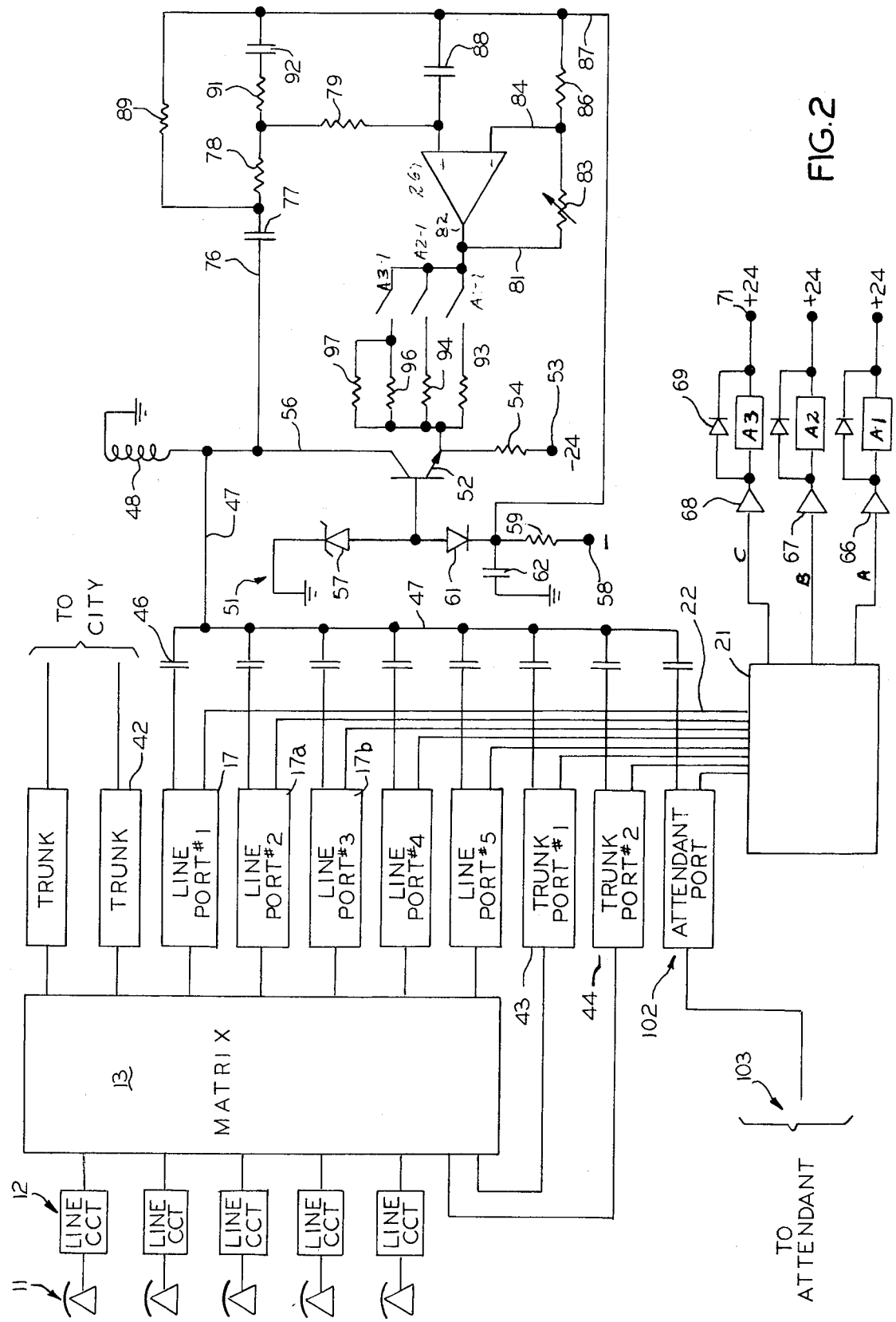
FIG. 2 is a specific showing of the two-way amplifier arrangement of FIG. 1 used in a conference call circuit.

In FIG. 2 the two-way amplifying arrangement is shown adapted for use as a conference call amplifier. A plurality of telephone stations are again shown as 11 and are respectively connected through a plurality of individual line circuits 12 to a matrix 13. The matrix 13 output is coupled to a transmission detecting device, such as port or link circuits, such as link circuits 17, 17a, 17b, etc. It can be seen, of course, that the matrix also is used to interconnect trunks shown as trunk 42 going to the city and trunk links 43 and 44, for example, connected to the input of the matrix 13.

The links are shown connected to the transmission path through coupling capacitors, such as coupling capacitor 46 going to common transmission path 47. The transmission path 47 is coupled to the hybrid network shown as coil 48. Each of the links, such as line port #1 shown as block 17, is also shown coupled to a logic circuit over conductors, such as conductor 22.

Means are provided for supplying current to the transmission line. More particularly, current source 51 is provided comprising NPN transistor 52 having its emitter coupled to negative voltage at 53 through resistor 54, and its collector coupled to coil 48 through conductor 56. The base of transistor 52 is coupled to ground through zener diode 57 and to negative voltage at 58 through resistor 59 and diode 61. Resistor 59 is bridged to ground by by-pass capacitor 62 which acts to filter out high frequency noises. Thus, in the base bias circuit, the base is coupled between the anodes of the diodes 57 and 61.

The logic circuit 21 determines how many of the link circuits or transmission detecting devices are coupled to line circuits connected in the conference call and are therefore, feeding signals to the logic circuit. Responsive to the receipt of the various signals from the detectors the logic circuit provides a signal on lines A, B or C or combinations thereof. The conductors A, B and C are connected to the inputs of relay driver amplifiers 66, 67 and 68, respectively. These relay driver amplifiers energize coils A1, A2 or A3 to operate relay contacts A1-1, A2-1 and A3-1. The relay coils A1, A2 and A3 are shown having spark depressing devices, such as diode 69, associated with coil A3. The end of the relays opposite the relay driver amplifiers are shown connected to positive voltage, such as the positive voltage located at 71 on the side opposite relay coil A3 from the relay driver amplifier 68.

Means are provided for amplifying the current supplied to the transmission line. More particularly, the positive input of operational amplifier 26 is coupled to the transmission line 47 through conductor 76, coupling capacitor 77, resistor 78 and a second resistor 79.

A variable feedback circuit is provided for the operational amplifier and connected to the negative input thereof. The feedback circuit extends through conductor 81 connected to the output 82 of the operational amplifier, variable resistor 83 and conductors 84 to the negative input of the operational amplifier. A resistor 86 is coupled to the negative voltage bus 87 and acts in conjunction with variable resistor 83 to determine the gain of the operational amplifier by, varying the feedback.

A high frequency cut-off circuit is provided by capacitor 88 connected from the negative voltage bus 87 to the positive input. Also, frequency compensation is further provided by the circuit including resistor 89 which bridges resistor 78 and resistor 91 and capacitor 92, in series. The junction of resistor 89 and capacitor 92 is coupled to negative voltage bus 87.

The output of the operational amplifier is coupled to the emitter of transistor 52 through contacts A1-1 A2-1 and A3-1, respectively, of the relays A1, A2 and A3. These relay contacts couple the operational amplifier through resistors, such as resistor 93, 94, 96 and 97, respectively to the emitter of transistor 52.

The number of relays operated is a function of the number of parties in the conference call circuit. If only two parties are in the conference call, then none of the relays are operated. When three parties are in the conference call, for example, relay A1 is operated to couple the operational amplifier into the current source over contacts A1-1 and resistor 93. The coupling of the negative signal from amplifier 26 to the emitter of transistor 52 increases the current flow therethrough. The current source 51 isolates the resistance coupling of the amplifier from the transmission line.

When a plurality of parties are connected to the conference call, then for example, all of the relays A1, A2 and A3 may be operated to thereby increase still further the output of the current source. Each of the coupling resistors 93, 94, 96 and 97 are approximately equal. Further, resistors 96 and 97 are tied together in parallel.

The logic equipment determines the number of stations attached into the conference call circuit. The appropriate number of relay coils A1, A2, A3 are energized as a function of the number of stations involved. As is obvious from the schematic, as more contacts are closed, the current output increases, since the signal amplitude received from amplifier 26 increases. As is also obvious from the schematic of FIG. 2, the closure of contacts A3-1 is equivalent to the closure of contacts A1-1 and A2-1.

An attendant port or link 102 and an attendant station indicated as 103 can also be connected into the conference call in the regular manner. Similarly, trunks, such as 44 and 43, can also be entered into the conference call using the single two-way amplifier arrangement shown herein.

Figure 3:
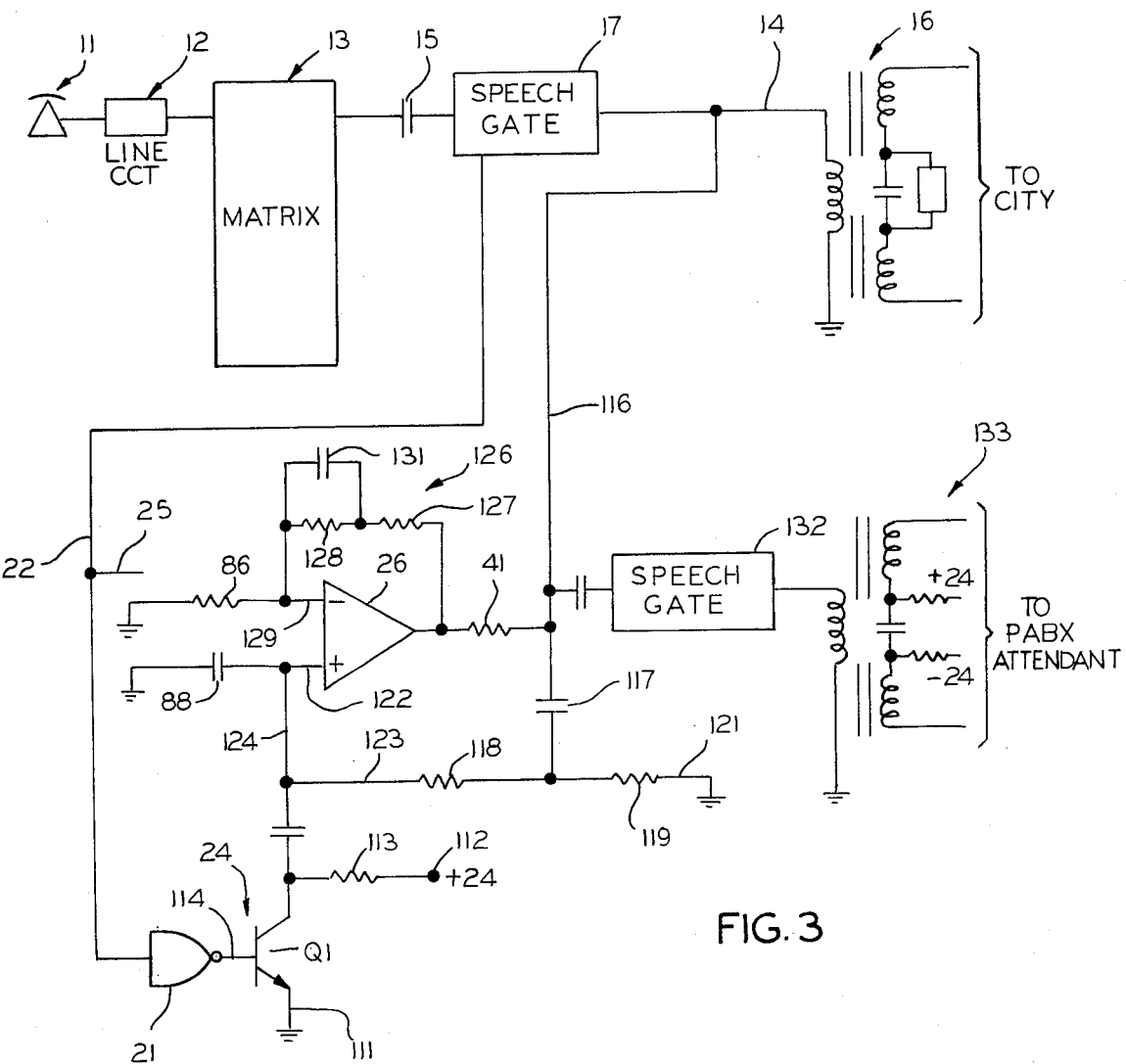
FIG. 3 is a schematic showing of the two-way amplifier arrangement of FIG. 1 used as a trunk amplifier.

When the two-way amplifier arrangement is used as a trunk amplifier, then the circuitry of FIG. 3 applies. Therein is shown a telephone station 11 connected through a line circuit 12, a matrix 13 and a coupling capacitor 15, a transmission detecting device, such as speech gate 17, and transmission line 14 to the hybrid network 16 to connect to a trunk going into the city, for example.

In FIG. 3 speech gate 17 sends a signal over conductor 22. Conductor 22, incidentally, can be connected to a plurality of speech gates or similar detecting devices over connections, such as shown at 25. The conductor 22 is coupled into a logic circuit shown herein as logic gate 21. The output of logic gate 21 is coupled into enabling circuitry, indicated generally as 24, but comprising NPN transistor Q1. The emitter of transistor Q1 is coupled directly to ground through conductor 111.

The collector of the transistor Q1 is connected to positive voltage at 112 through load resistor 113. The base of the transistor Q1 is connected to the logic circuit 21 through conductor 114. In this circuit the transistor Q1 is normally conducting, because of a signal normally received from logic gate 21. However, responsive to an indication from speech gate 17 to indicate that there is transmission on transmission line 14, logic circuit 21 is turned off and transistor Q1 stops conducting.

When the transistor Q1 stops conducting, then the operational amplifier 26 is enabled. It receives a signal into its positive input from transmission line 14 over a circuit that extends through conductor 116, coupling capacitor 117, resistor 118 of a divider network comprising resistors 118, 119 connected to ground at 121, and to the positive input 122 through conductors 123 and 124.

The output of the operational amplifer 26 is carried through coupling resistor 41 and conductor 116 back to transmission line 14. A feedback circuit 126 is provided. It comprises resistors 127 and 128 connected in series between the output of operational amplifier 26 and the negative input 129. Resistor 128 is bridged by frequency compensation capacitor 131. Since the feedback components are not variable, the gain of the amplifier is fixed.

the amplified current is retransmitted to the transmission line. It should be noted that the amplified current will be placed on the transmission line, whether the telephone party station 11 is the calling party or the called party.

Similarly, if a speech gate 132 is activated, by an attendant cabinet at PABX shown generally at 133, then the speech gate 17 will be further activated to operate the operational amplifier and perform the two-way amplification. Thus, the two-way amplifier can be used in many ways in telephony. For example, the conference amplifier is shown in FIG. 2 or the trunk amplifier is shown in FIG. 3.

While the principles of the invention have been described above in connection with the specific apparatus and applications, it is to be understood that this description is made only by way of example, and not as a limitation on the scope of the invention.

I claim:

1. In a PABX conference call system, means for interconnecting two or more telephone stations in a conference type call, said interconnecting means including a signal transmission circuit for transmitting voice frequency signals originating from each telephone station connected in the call to each remaining telephone station that is connected in the call, the improvement comprising means (a) for amplifying voice frequency signals transmitted by said transmission circuit by a first predetermined amount only in response to the interconnection of a first pre-selected number of the telephone stations by said interconnecting means and (b) for amplifying the voice frequency signals transmitted by said transmission circuit by a second predetermined amount only in response to the interconnection of a second pre-selected number of the telephone stations by said interconnecting means, said first pre-selected number being in excess of two and less than said second pre-selected number, and said second predetermined amount being more than said first predetermined amount.

2. A PABX conference call system providing service for extension telephones in a PABX and having means for connecting each extension telephone in a conference type call in which the number of interconnected telephones may be in excess of two, said connecting means comprising (a) at least one trunk connection which is adapted to be connected to a transmission line extending from a central office, (b) a plurality of first transmission links, (c) at least one additional transmission link, (d) a switching matrix for connecting each extension telephone to be interconnected in the conference call to a different one of said first transmission links and for connecting said trunk connection to said additional transmission link whenever a further telephone remote from said PABX is to be connected into the call by way of said central office and said transmission line and (e) means providing a common transmission path interconnecting said first and additional transmission links to effect the transmission of voice frequency signals originating from each of the telephones connected in the conference call to each of the remaining telephones in the conference call, each of said first and additional links having means for detecting when it is connected to one of the telephones in a call, and means intermediate said detecting means and said common transmission path and controlled by the detecting means in said links for effecting amplification of voice frequency signals originating from each telephone in the conference call by a predetermined amount only in response to the interconnection of a number of said telephones in a conference call in excess of two.

3. In a PABX conference call system, means for interconnecting two or more telephone stations in a conference type call, said interconnecting means including a signal transmission circuit for transmitting voice frequency signals originating from each telephone station connected in the conference call to each remaining telephone station that is connected in the call, the improvement comprising detecting means connected to said transmission circuit for detecting whether or not the number of telephone stations interconnected in the conference call by said interconnecting means exceeds two, and means under the control of said detecting means for amplifying the voice frequency signals transmitted by said transmission circuit only when said detecting means detects that the number of telephone stations interconnected in the conference call is in excess of two.

4. In a PABX conference call system, means for interconnecting two or more telephone stations in a conference type call, said interconnecting means including a signal transmission circuit for transmitting voice frequency signals originating from each telephone station connected in the conference call to each remaining telephone station that is connected in the call, the improvement comprising detecting means connected to said transmission circuit for producing a number of separate predetermined signals corresponding to the number of telephone stations that are interconnected in the conference call by said interconnecting means, amplifier means, and means connected to said detecting means and responsive to the signals produced by said detecting means for establishing a circuit connection intermediate said amplifier means and said transmission circuit to increase the power of the voice frequency signals transmitted by said transmission circuit only when the number of said signals produced by said detecting means is equal to or exceeds a pre-selected number that is greater than two.

5. The PABX conference call system defined in claim 4 wherein said transmission circuit comprises a plurality of transmission links, said interconnecting means further including a switching circuit for establishing a voice frequency signal transmitting connection between each telephone station to be connected in a conference call and a different one of said links, and said transmission circuit further comprising means providing a common signal-transmitting path interconnecting said links so that voice frequency signals originating from each telephone station connected in the conference call are fed to each of the remaining telephone stations connected in the call, said circuit connection being established intermediate said common signal-transmitting path and said amplifying means, and said detecting means comprising a plurality of sensing circuits each connected to a different one of said links for developing a different one of said predetermined signals.

6. The PABX system defined in claim 5 wherein said means responsive to the signals produced by said detecting means includes a circuit connected to said sensing circuits and responsive to said predetermined signals for producing a control signal only when the number of said predetermined signals is equal to or greater than said pre-selected number, and means rendered effective by said control signal for establishing said circuit connection.

7. In a PABX conference call system providing service for extension telephones in a PABX, means for interconnecting two or more telephone stations in a conference type call in which at least one of the interconnected telephone stations is one of said extension telephones, said interconnecting means including a signal transmission circuit for transmitting voice frequency signals originating from each telephone station connected in the conference call to each remaining telephone station that is connected in the conference call, the improvement comprising means providing for the amplification of the voice frequency signals transmitted by said transmission circuit only in response to the interconnection by said interconnecting means of a number of telephone stations in a given call in excess of a pre-selected number that is not less than two.

8. The PABX conference call system defined in claim 7 wherein said pre-selected number is two and wherein said transmission circuit includes (a) a current-conducting member common to all of the telephone stations interconnected in the conference call, and (b) means providing a voice frequency signal-transmitting path connecting each telephone station in the conference call to said current-conducting member whereby the voice frequency signals originating from each telephone station connected in the conference call are transmitted by way of said current-conducting member to each of the other telephone stations that are connected in the conference call, said means providing for the amplification of said voice frequency signals comprising an amplifier circuit connected to said current-conducting member.

9. In a PABX conference call system providing service for extension telephones in a PABX, means for interconnecting two or more telephone stations in a conference type call in which at least one of the interconnected telephone stations is one of said extension telephones, said interconnecting means including a signal transmission circuit for transmitting voice frequency signals originating from each telephone station connected in the conference call to each remaining telephone station that is connected in the conference call, the improvement comprising first means connected to said transmission circuit for producing a control signal only when the number of telephone stations interconnected in a conference call by said interconnecting means exceeds two, and second means intermediate said first means and said transmission circuit and responsive to said control signal for effecting the amplification of the voice frequency signals transmitted by said transmission circuit.

* * * * *